United States Patent
Smith et al.

(10) Patent No.: US 6,569,348 B1
(45) Date of Patent: *May 27, 2003

(54) TREATING COAL AND OTHER PILED MATERIALS TO INHIBIT FREEZE-BINDING

(75) Inventors: Kevin W. Smith, McMurray, PA (US); Mark E. Stanley, Wexford, PA (US)

(73) Assignee: Clearwater, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/217,045

(22) Filed: Aug. 12, 2002

Related U.S. Application Data

(63) Continuation-in-part of application No. 09/943,998, filed on Aug. 31, 2001, now Pat. No. 6,495,063.

(51) Int. Cl.⁷ .................................................. C09K 3/18
(52) U.S. Cl. ........................................... 252/70; 106/13
(58) Field of Search ............................... 252/70; 106/13

(56) References Cited

U.S. PATENT DOCUMENTS

| | | | |
|---|---|---|---|
| 2,233,185 A | 2/1941 | Smith | |
| 4,117,214 A | 9/1978 | Parks et al. | |
| 4,287,236 A | 9/1981 | Kestner et al. | |
| 4,746,449 A | 5/1988 | Peel | |
| 5,064,551 A | 11/1991 | Smith | |
| 5,079,036 A | 1/1992 | Roe et al. | |
| 5,104,562 A | 4/1992 | Kardos et al. | |
| 5,132,035 A | 7/1992 | Hoenke et al. | |
| 5,730,895 A | 3/1998 | Moore | |
| 5,843,330 A | 12/1998 | Barbour et al. | |
| 5,846,450 A | 12/1998 | Atkinson | |
| 5,922,241 A | 7/1999 | Becker et al. | |
| 5,961,875 A | 10/1999 | Miyake et al. | |
| 5,993,875 A | 11/1999 | Hjornevik et al. | |
| 6,059,989 A | 5/2000 | Stankowiak et al. | |
| 6,059,996 A | 5/2000 | Minks et al. | |
| 6,129,857 A | 10/2000 | Sapienza | |
| 6,149,833 A | 11/2000 | Dietl | |
| 6,156,226 A | 12/2000 | Klyosov et al. | |
| 6,287,480 B1 | 9/2001 | Berglund et al. | |

FOREIGN PATENT DOCUMENTS

| | | |
|---|---|---|
| EP | 0 306 972 B1 | 3/1989 |
| WO | WO 96/39472 | 12/1996 |
| WO | WO 97/01612 | 1/1997 |

*Primary Examiner*—Anthony J. Green
(74) *Attorney, Agent, or Firm*—William L. Krayer

(57) ABSTRACT

Coal and other piles of particulates exposed to the weather are inhibited from freezing by treating them with potassium formate. A viscosifier is used to retain the solution in the interstices and voids between the particulates, inhibiting drainage and waste of the solution. Corrosion inhibitors are also compatible with the solution.

18 Claims, No Drawings

TREATING COAL AND OTHER PILED MATERIALS TO INHIBIT FREEZE-BINDING

RELATED APPLICATION

This application is a continuation-in-part of our copending application 09/943,998 filed Aug. 31, 2001, U.S. Pat. No. 6,495,063 having the same title.

TECHNICAL FIELD

This invention relates to inhibiting the freezing of water on coal and other particulate products, to maintain a substantially free-flowing state under otherwise subfreezing conditions. Under the influence of the invention, ice crystals which may be formed are weaker than would otherwise would be the case, also tending to maintain a substantially free-flowing state in coal piles and in other accumulations of particulate materials to be moved.

BACKGROUND OF THE INVENTION

Coal is stored, shipped and transferred in many locations having cold climates and in areas likely to experience temperatures below the freeze point of water. Most material handling equipment is designed to handle free-flowing materials, not materials which are frozen together in large chunks. Entire piles of coal have been known to accumulate significant amounts of water which may continue to accumulate over a period of days and become almost monolithic, frustrating efforts to break them apart and ship or transfer without extraordinary efforts.

The problem is stated succinctly by Parks et al in U.S. Pat. No. 4,117,214, column 1, lines 22–36: "For example, coal with as little as 4% moisture will, when frozen, cohere so strongly as to require special handling to break up the frozen mass. It thus becomes difficult to unload or dump railway cars, trucks and other conveyances used to transport coal, mineral ores and other finely divided solids. It also makes difficult the movement of coal out of outdoor coal storage piles in a condition for fuel or other use. Unloading frozen coal from railroad cars is time consuming, can result in blocked dump chutes and can often leave as much as 30 to 60 tons of coal in the car. Various techniques such as vibration, steam lances, fires under the cars, infrared heating in warming sheds and even dynamiting have been tried to unload frozen cars." Parks et al go on to suggest applying to the coal a solution of a non-volatile organic compound and a water-soluble polyhydroxy compound or monoalkylether thereof, in order to weaken the ice that is nevertheless formed.

SUMMARY OF THE INVENTION

We have found that applying a solution of potassium formate on a pile or other mass of coal, minerals or other solid particulate material will inhibit the formation of coherent ice in the interstices of the particulate material. The effects of a solution of potassium formate are three: the freeze point of water is reduced, thus inhibiting the formation of ice; where ice is nevertheless formed in the presence of potassium formate, it is weaker than ice formed in the absence of potassium formate, and, if ice has already been formed prior to the application of potassium formate, the application of potassium formate will melt the ice.

Preferably the potassium formate solution is applied prior to the onset of snow or freezing rain. It may be applied in any effective manner, such as by pouring, but spraying is preferred. A spray may be conducted so that the coal or other particulates are wet with the solution at the time the snow or freezing rain arrives, or so that the water from the solution has evaporated by the time the precipitation arrives, leaving a residue of potassium formate on the particulates. In the former case, (prior to the arrival of precipitation), the still liquid solution of potassium formate on the surface of the particulates may be diluted with moisture from the snow in immediate contact with it before the pile is covered with snow, but the effect is that if ice forms, an underlayer of potassium formate solution is actually in contact with the coal or other particulate surface, and the freeze point of the solution is thereby reduced. Even when or if there are cycles of thawing and freezing, the concentration of potassium formate remains highest at the surface of the coal, mineral or other particulates, greatly decreasing the tendency of the weakened ice which does form to coalesce a large portion of the pile or other mass.

In the second case, where the potassium formate solution is sprayed on the previously formed ice or frozen mass of ice and snow, the solution will tend to dissolve the frozen mass, because of its lower freezing point.

In a third variation of the invention, finely divided solid potassium formate is sprinkled on the pile or mass of particulates prior to precipitation likely to form a frozen mass in the interstices of the particulates.

The term "particulates" is used herein to refer to both small and large substantially water-insoluble particles, ranging from finely ground material to large lumps such as large lumps of coal, and includes materials and ores having a wide range of hardness and moisture contents.

DETAILED DESCRIPTION OF THE INVENTION

Table 1 shows the freeze points of increasing concentrations of potassium formate in water.

TABLE 1

| Potassium Formate Solution Freeze Points | |
| --- | --- |
| Percent by Weight KCOOH | Freeze Point, ° F. |
| 4 | 28 |
| 8 | 23 |
| 12 | 18 |
| 16 | 11 |
| 20 | 4 |
| 24 | −5 |
| 28 | −13 |
| 32 | −25 |
| 36 | −37 |
| 40 | −49 |
| 44 | −61 |
| 48 | −75 |

When applying the potassium formate solution by spraying ahead of precipitation likely to freeze, we may use concentrations of 1% to 76% by weight, preferably 15% to 60%, and more preferably 30% to 55%. When applying the potassium formate solution to an already frozen mass of material, a concentration of 60% to 76% is preferred; most preferably it is applied in the form of a high pressure spray. By a high pressure spray, we mean one having a pressure higher than normally obtained from a municipal water pressures; it may be in the form of a solid stream or as one or more jets. The solution may be heated.

Experiments were performed to determine the effectiveness of the invention on the cohesive strength of wet coal below 0° C. Comparisons were made of 50% ethylene glycol in water (Control) to potassium formate at 38 and 50 weight percent in water. Minus 6 mesh coal was first thoroughly mixed and divided into three samples which were adjusted to 5%, 10%, and 15% moisture content. Each sample was then divided into five portions and placed in separate plastic bags. Using a syringe, the three solutions were added to each bag at a rate equivalent to two pints per ton, and thoroughly mixed to wet the surfaces of the particulates. For each of the three solutions to be tested, five substantially similar 1 kg wet samples were poured onto pans previously lubricated with mold release agent. The 1 kg samples of coal were consolidated by dropping them a distance of 1 inch to a laboratory bench, and then frozen on the pans at −10° C. for 24 hours.

The pans were then inverted and the frozen samples dropped onto a steel grate having 1.25 inch square openings. The procedure for each drop was to drop from the prescribed height, remove and weigh the coal which passed through the grate, retrieve the remaining coal from the top of the grate, and drop it from the next incremental height. The coal passed was weighed, the remaining coal retrieved and dropped from the next incremental height. The procedure was iterated until all the coal passed or until the drop height limit of 8 feet was reached. At certain heights, as many as 5 drops were used and the results averaged; at other heights, fewer drops were needed, as it was clear, for example, that virtually all the coal would pass. Following, in Table 2, is a summary of the results.

the particulates, which will be dissolved by snow or freezing rain, thus reforming a potassium formate solution on the surfaces of the particulates.

Our invention also includes a method of reducing the cohesiveness of a mass of particulates held together by frozen precipitation comprising applying thereto an effective amount of a solution comprising potassium formate. The application may be accomplished by spraying under high or low pressure.

In any case, whether the potassium formate solution is applied before or after ice formation, it may include effective amounts of more or less conventional corrosion inhibitors, or any other corrosion inhibitor effective to reduce corrosion, particularly where oxygen may be dissolved in the solution, as may be expected. Where the coal or other particulate pile is in a steel container such as a railroad car or a steel bin, corrosion inhibitors known to be useful for steel are preferred. Corrosion inhibitors may be used such as triethanolamine, alkali metal and, less preferably, alkaline earth metal, metaphosphates, pyrophosphates, phosphonates and orthophosphates, molybdates, nitrates, nitrites and borates, organic amines and organic acids such as azeleic, sebacic, ascorbic, malonic, oxalic, maleic, known to inhibit corrosion in aqueous systems, that is, acids of the formula RCOOH or HCOOCRCOOH where R is a hydrocarbyl group of 0 to 10 carbon atoms and their alkali metal, alkaline earth metal and ammonium salts. Small amounts (from 0.01% by weight to 5% by weight, preferably 0.1–3%)) may

TABLE 2

| | Weight Percent Coal Passing Grate | | | | | | | | |
|---|---|---|---|---|---|---|---|---|---|
| | 5% Moisture | | | 10% Moisture | | | 15% Moisture | | |
| Drop Ht, ft | 50/50 EG | 38% KF | 50% KF | 50/50 EG | 38% KF | 50% KF | 50/50 EG | 38% KF | 50% KF |
| 2 | 100 | 100 | 100 | 43 | 42 | 37 | 4 | 5 | 5 |
| 3 | 100 | 100 | 100 | 83 | 78 | 79 | 13 | 11 | 10 |
| 4 | 100 | 100 | 100 | 99 | 99 | 98 | 22 | 21 | 19 |
| 5 | 100 | 100 | 100 | 100 | 100 | 100 | 33 | 31 | 32 |
| 6 | 100 | 100 | 100 | 100 | 100 | 100 | 48 | 44 | 47 |
| 7 | 100 | 100 | 100 | 100 | 100 | 100 | 63 | 56 | 58 |
| 8 | 100 | 100 | 100 | 100 | 100 | 100 | 77 | 70 | 72 |

KF = potassium formate
EG = ethylene glycol

The results demonstrate that potassium formate solution is substantially equivalent to glycol in effectiveness.

The environmental acceptability of potassium formate, however, is superior to glycol.

Corrosion inhibitors commonly used with alkali metal or alkaline earth metal ice melters may be used with our potassium formate solutions; likewise, small amounts of water soluble polymers (an example is polyacrylamide) may be used in our invention together with the potassium formate to reduce loss through drainage. That is, the polymer will impart a viscosity to the solution sufficient to cause an increased portion of the solution to adhere to the particulates and remain on them to be effective in reducing the freezing point of any water that comes in contact with it.

Thus, our invention includes a method of inhibiting the solidification by freezing of a mass of solid particulates subject to precipitation comprising spraying onto said mass prior to said precipitation an aqueous solution comprising potassium formate. It will be understood that, either by accident or design, the solution may dry before the precipitation arrives, leaving a precipitate of potassium formate on be effective to a degree correlative to the amount. Accordingly, effective corrosion inhibitors may comprise silicates, phosphates, high molecular weight copolymers or phosphonates, or mixtures of two or more of these classes of compounds. Other examples of corrosion inhibitors include sodium metasilicate, tripotassium phosphate, styrene-maleic acid copolymers and aminotris(methylenephosphonic acid)/zincsulfate. Mixtures of any of the corrosion inhibitors mentioned herein may be quite effective. Possible mixtures include small amounts of sodium metasilicate, tripotassium phosphate, styrene-maleic acid copolymers and, for example, a mixture of 1 part by weight of aminotris (methylenephosphonic acid) and 5 parts by weight of zinc sulfate. Aspartic acid, glycine, polyglycine, glutamic acid, polyglutamic acid, alone or together with aminophosphonic acids and their salts, may also be used, as can polyaspartic acid and phosphonocarboxylic acid oligomers and their salts, as disclosed in U.S. Pat. No. 6,207,079, and sodium lactate as described in U.S. Pat. No. 6,149,833. Cinnamic acid, alkylcinnamic acid, and alkoxycinnamic acid and their salts, as disclosed in U.S. Pat. No. 5,961,875, zinc amino carboxylates such as disclosed in U.S. Pat. No. 6,127,467, and any corrosion inhibitor known to be effective in cooling water systems, such as discussed in U.S. Pat. No. 6,077,460, only one of numerous patents on the subject which are also of interest in reciting corrosion inhibitors for aqueous systems also useful in our invention. Any corrosion inhibitor effective for protecting steel in an aqueous environment may be used.

A "package" of some of the corrosion inhibitors mentioned above has been demonstrated to be effective in inhibiting corrosion of potassium formate solution under laboratory conditions. While an aerated solution of 37% potassium formate yielded weight losses on 15 g carbon steel coupons of 36.6 mg after two weeks at ambient temperature, an aerated 27% potassium formate solution yielded only a 1 9.3 mg loss after 26 days, in the presence of a corrosion inhibitor package of the following composition, by weight in the solution:

| | |
|---|---|
| Magnesium formate | 0.2% |
| Polyacrylic Acid (about 2500 mw) | 1.0% |
| Sodium metabisulfite | 0.5% |
| Sodium Molybdate | 0.2% |
| Potassium azelate | 0.4% |
| Tolyltriazole | 0.0245% |

In addition, our invention includes the use of a viscosifier in the potassium formate solution. The viscosifier is used to inhibit the draining of the potassium formate solution away from contact with the coal or other particulates. That is, the ability of the potassium forrnate solution to inhibit the formation of ice in the interstices and otherwise on the surface of the coal is enhanced by the presence of the viscosifier, which reduces the incidence of waste by causing the solution to remain on the coal surface and in the interstices of the pile rather than draining to the floor of the container. The viscosifier is effective not only on the open or top surface of the coal or other particulates, but is especially effective where it is between two particulate surfaces—that is, the viscosifier is especially effective because of its ability to enable the solution to fill substantial portions of the voids between particulates, remaining substantially stationary therein, thereby inhibiting draining and waste of the solution which otherwise might ineffectively drain through the pile. In a coal pile, it is desirable that a substantial portion of the void space between adjacent coal pieces near the surface of the pile—that is, coal pieces contacting each other within about 0.5 meter from the surface—be filled with viscosified potassium formate solution Desirably, the void space within about one centimeter in all directions from a contact point of two adjacent pieces of coal should be filled with viscosified solution; as a practical matter, at least about 25% of the contact points in the uppermost 0.5 meter should be so filled. Viscosifiers are generally water soluble polymers, which may be either synthetic or natural, i.e. biopolymers. Suitable synthetic polymers include polyacrylamide, copolymers of acrylamide and acrylic acid, N,N-dimethylacrylamide, 2-acrylamido-2-propane sulfonic acid (AMPS), and quaternary monomers such as 2-(methacryloxy)ethyl trimethyl ammonium sulfate, diallyl dimethyl ammonium chloride (DADMAC), homopolymers of any of the monomers just named, polyvinylalcohol, polyethyleneoxide, polyvinylpyrrolidinone, and any of numerous other viscosifying synthetic polymers known in the art, including some which may be slightly crosslinked with difunctional monomers such as methylene bis acrylamide. Natural polymers that are suitable include various polygalactomannans, guar, xanthan, locust bean gum, starch, cellulose, and derivatives of any of these such as carboxymethyl guar, carboxymethylhydroxyethylguar, carboxymethylcellulose, carboxymethyl hydroxyethyl cellulose, and any other natural or biopolymer or a derivative thereof that will viscosify an aqueous solution. Such materials may be used in any amount effective to inhibit draining in the pile to any degree—that is, for example, if the solution is effective to reduce draining by one percent of the amount of solution that would otherwise drain through the pile on spraying, to reach the bottom of the pile, leaving the remaining portion of the solution to wet the coal or other particulate material and reside in the interstices, we consider the viscosifier to be effective. Generally, effective amounts will range from 0.001% by weight to 5% by weight, preferably 0.01–3%, more preferably 0.1–2%, depending on the particular viscosifier and the type of particulate.

The potassium formate solution may be used with a corrosion inhibitor, a viscosifier, or both. A preferred potassium formate solution including both is one comprising 0.05% aminotrisphosphonic acid or a salt thereof and 0.1% guar. However, any of the above recited corrosion inhibitors may be used together with any of the above recited viscosifiers in the amounts mentioned above.

What is claimed is:

1. Method of inhibiting the solidification by freezing of a mass of solid particulates, said mass having a surface subject to precipitation, said mass also including contact points and void spaces between said solid particulates, comprising applying to said mass prior to said precipitation an aqueous solution comprising at least one percent by weight potassium formate.

2. Method of claim 1 wherein said solution comprises 15 to 60% potassium formate by weight.

3. Method of claim 1 wherein said solution comprises 30 to 55% potassium formate by weight.

4. Method of claim 1 wherein said solid particulates are coal.

5. Method of claim 4 wherein said solution includes a viscosifier and wherein the void space within about one centimeter of at least 25% of the contact points of said solid coal particulates, said contact points being within about 0.5 meter of the surface of said mass, is filled with said solution.

6. Method of claim 1 wherein said solution is applied after at least some ice is formed on the surface of said solid particulates.

7. Method of claim 1 wherein said solution includes a corrosion inhibitor.

8. Method of claim 1 wherein said solution includes a viscosifier.

9. Method of claim 1 wherein said solution is applied by spraying.

10. Method of claim 1 wherein said mass is in a steel container and said potassium formate solution includes an amount of corrosion inhibitor effective to inhibit corrosion of said container and an amount of viscosifier effective to inhibit draining of said solution.

11. Method of claim 10 wherein said corrosion inhibitor is present in an amount from 0.01% to 5% by weight and said viscosifier is present in an amount from 0.001% to 5% by weight of said solution.

12. Method of claim 11 wherein said corrosion inhibitor is present in an amount from 0.1% to 3% by weight and said viscosifier is present in an amount from 0.01% to 3% by weight of said solution.

13. Method of reducing the cohesiveness of a mass of particulates held together by frozen precipitation comprising applying thereto a solution comprising potassium formate in an amount effective to reduce said cohesiveness.

14. Method of claim 13 wherein said solution comprises 1–76% potassium formate by weight.

15. Method of claim 13 wherein said solution comprises 15–60% potassium formate by weight.

16. Method of claim 13 wherein said solution comprises 30–55% potassium formate by weight.

17. Method of claim 13 wherein said solution includes a corrosion inhibitor.

18. Method of claim 13 wherein said solution includes a viscosifier.

* * * * *